US008508504B2

(12) United States Patent
Mo

(10) Patent No.: US 8,508,504 B2
(45) Date of Patent: Aug. 13, 2013

(54) METHODS OF FILTERING NOISE IN CAPACITIVE TOUCH PANEL

(75) Inventor: LiangHua Mo, Shenzhen (CN)

(73) Assignee: Focaltech Systems, Ltd., George Town, Grand Cayman (KY)

(*) Notice: Subject to any disclaimer, the term of this patent is extended or adjusted under 35 U.S.C. 154(b) by 27 days.

(21) Appl. No.: 13/325,475

(22) Filed: Dec. 14, 2011

(65) Prior Publication Data
US 2012/0268417 A1  Oct. 25, 2012

(30) Foreign Application Priority Data

Apr. 25, 2011 (TW) .............................. 100114253 A

(51) Int. Cl.
    *G06F 3/045* (2006.01)
(52) U.S. Cl.
    USPC ........................................... 345/174; 345/173
(58) Field of Classification Search
    USPC ................................................ 345/156–175
    See application file for complete search history.

(56) References Cited

U.S. PATENT DOCUMENTS

| 7,808,490 | B2* | 10/2010 | Chang et al. ................... 345/173 |
| 2010/0060609 | A1* | 3/2010 | Doi et al. ........................ 345/174 |
| 2010/0295816 | A1* | 11/2010 | Zhang ............................ 345/174 |
| 2011/0157064 | A1* | 6/2011 | Imai .............................. 345/173 |
| 2011/0157069 | A1* | 6/2011 | Zhuang et al. ................. 345/174 |
| 2011/0216039 | A1* | 9/2011 | Chen et al. .................... 345/174 |
| 2011/0261007 | A1* | 10/2011 | Joharapurkar et al. ........ 345/174 |
| 2012/0049869 | A1* | 3/2012 | Kremin et al. ................. 324/679 |
| 2012/0182225 | A1* | 7/2012 | Brosnan ......................... 345/173 |
| 2012/0188201 | A1* | 7/2012 | Binstead ........................ 345/174 |
| 2012/0217978 | A1* | 8/2012 | Shen et al. ..................... 324/601 |

* cited by examiner

*Primary Examiner* — Kent Chang
*Assistant Examiner* — Sujit Shah
(74) *Attorney, Agent, or Firm* — Jones Day

(57) ABSTRACT

The present invention relates to a method of filtering noise in capacitive touch panel. By performing the correlation scan more than one time on the same channel, comparing the results of the correlation scans, and determining background noise by empty scans, the noise in capacitive touch panel can be filtered.

15 Claims, 1 Drawing Sheet

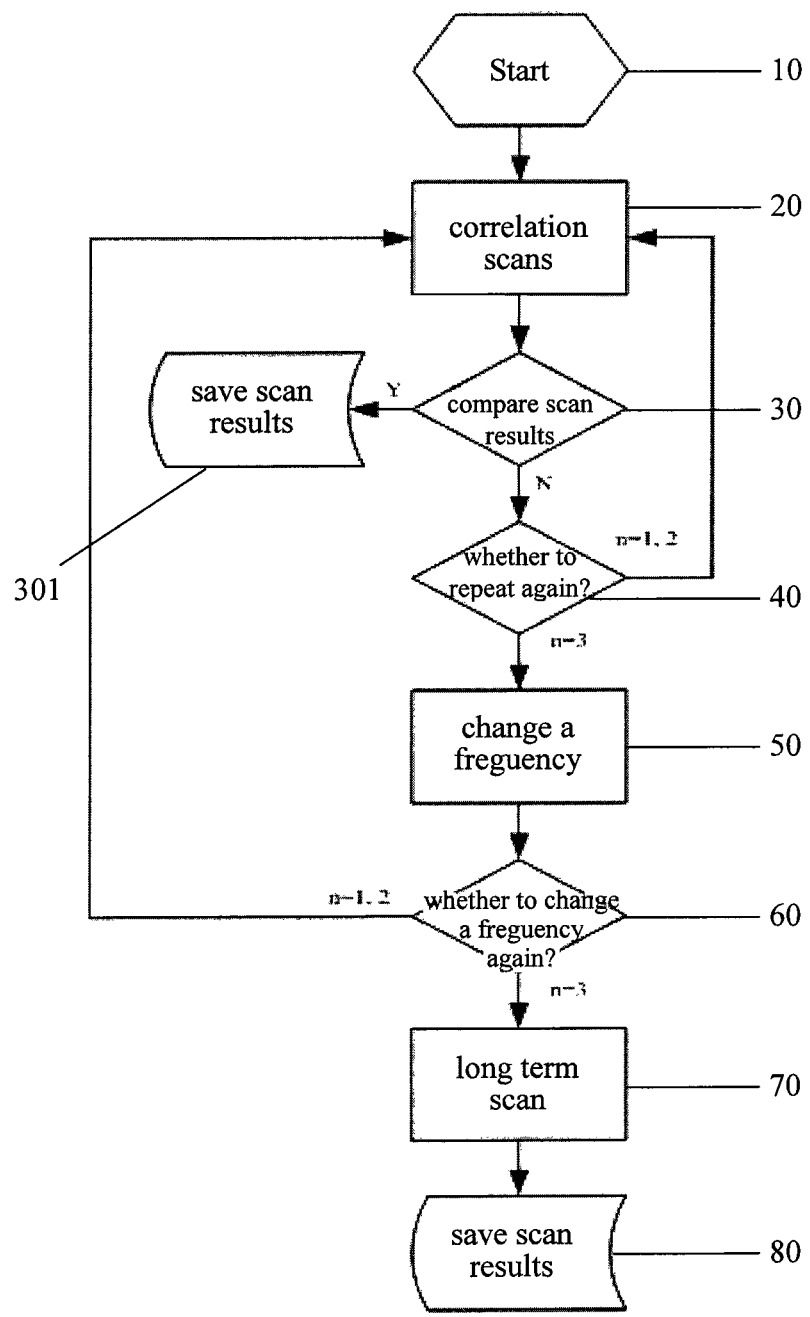

METHODS OF FILTERING NOISE IN CAPACITIVE TOUCH PANEL

BACKGROUND OF THE INVENTION

1. Field of the Invention

The present invention relates to a method of filtering noise in capacitive touch panel. More specifically, the present invention relates to a filtering noise method in capacitive touch panel by comparing the results of correlation scans.

2. Description of Related Art

With the development of capacitive touch panel, more and more users get used to capacitive touch panel. But the expensive price of capacitive touch panel systems hindered the market. Capacitive touch panel is sensitive to electrical source noise, RF noise and LCD noise. The electrical source noise could be classified into power frequency noise (50/60 Hz) and power switch noise. The power frequency noise is strong in magnitude, generally ranged from tens to two hundred volts. If the circuit design is not proper, the system might be failed due to power frequency noise. Different power switch will produce different power switch noise. The frequency of power switch noise, which ranged from tens to hundreds KHz, is very close to the signal scan frequency of touch panel system. Thus, the signal will be easily disturbed.

RF noise is another noise source of touch panel system. Generally, a frequency of more than 1 GHz will not disturb the touch panel system because such high frequency signal will be immediately attenuated by circuits. But the envelope signal of these high frequency signals, which has a lower frequency, is likely to disturb the touch panel system.

LCD noise becomes more and more important concern. Modern design tries to eliminate the thickness by reducing the distance between the touch panel and LCD or by eliminating the thickness of the touch panel itself. The frequency of LCD line drive signal is about tens of kHz, which will disturb normal scan frequency. The capacitive touch panel noise has the following characteristics: (1) Definiteness: Some of the noise is definite once the system is built. For example, the power source noise including working frequency noise and power switch noise is closely related to the power switch and is determined by power switch. The RF noise between terminal and touch panel is definite, such as GSM, CDMA, WiFi, Bluetooth and etc. LCD noise is also definite. Thus, the magnitude of touch panel system's noise and frequency are basically definite. Further, the systems using touch panels are often portable devices, they are subject to changing outside environment. The parameters of the environment such as power source and RF noise are basically definite. In a word, touch panel systems are affected by definite noise under normal use. Only under exceptional cases will the touch panel systems be affected by indefinite noise. When the systems are affected by indefinite noise, short-term failure (ex: under 100 mS) is acceptable. (2) Duration Is Short: The frequency of power switch noise is not high (tens of kHz), and the duration is very short, only several micro seconds. During the cycle of noise signal, the noise only lasts for a very short time. For the LCD screen, the scan frequency is tens of Hz. Because there are hundreds of lines, the disturbance duration of each line only represents one hundredth of a cycle. In the application U.S. 20080162997A1, three different frequencies are used when one scans noise, and the results of the scans will be compared to determine one reliable result. With the developments of more and more applications of the capacitive touch panel, cost down becomes a very important issue. The prior art is not cost-effective because it requires all noises should be limited in a small frequency zone, and it is expensive to meet such requirement.

One should carefully consider the RF disturbance during the design stage of the capacitive touch panel. The structure design of the terminal is complex and many factors contribute to it. In order to reduce the RF disturbance, certain compromises will be made: it maybe thicker, the reliability maybe lower, or more cost should be spent. Adding a mask to the touch panel also increase the cost and complexity of the structure.

Currently, LCD noise is prevented by adding a mask layer or mask electrode. Accompanying the mask layer, it often requires an ITO glass layer or ITO film layer, which increases both cost and thickness. There are many shortcomings in the method mentioned in U.S. 20080162997A1 application: First, the relation among many frequencies is not close, which adds difficulty to the comparison process. Second, if the used frequency is already disturbed, then the result becomes meaningless.

SUMMARY OF THE INVENTION

The invention relates to a method of improving the scan to provide lower noise under lower cost and simplified system design. The invention uses co-relation multiple scans at the same frequency, jumping scans, long-term scans, and varying scans to filter the noise, and uses empty scans to evaluate the background noise. The method of filtering noise in this invention does not relate to the method transforming touch signal to digital signal. The invention does not relate to synchronous demodulator or analog-digital converter. The invention relates to co-relation sampling (if necessary, jumping frequency, long-term sampling, and varying sampling will be used) to discover and to reduce the noise.

BRIEF DESCRIPTION OF THE DRAWINGS

The above and other features of the present disclosure becomes more apparent by describing in flow chart thereof with reference to the accompanying drawings, in which:

FIG. 1 is a flow chart of the method according to the present invention.

DETAILED DESCRIPTION

The invention relates to co-relation multiple scans at the same frequency, that is, process multiple scans for the same channel or nod continuously at the same frequency. Because all the parameters are the same and the time interval is very short, we could believe the results of the scans are highly related. If no other high frequency signal exists, we could even believe the results of the scans are the same. The time interval between two scans could be a half cycle or no interval. For example, if the first scan begins at the rising cycle, then the second scan should begin at the falling cycle, and processed by an inverter which transformed the falling cycle to rising cycle. If we are disturbed at one frequency, we should re-scan at a different frequency which could reduce the influence of fixed frequency noise or noise which comes from the environment. We use the empty scan to determine the background noise. We obtain the signal of background noise at the receiving terminal when the emitting terminal does not emit any signal.

Because of the close relation among space, time, and circuits, the results of co-relation scans are highly related for the touch signals are very low frequency signals unless the system is disturbed by high frequency or fixed frequency noise. Thus we could compare the results of co-relation scans to determine the noise signal. For example, assuming the magnitude of normal tactile signal is VT, and we receive a signal of 0.4 VT, we could choose 0.2 VT as a determinant. If the difference between two results VS1 and VS2 is greater than 0.2 VT, we could conclude that the current noise has disturbed normal tactile signal. We could filter the noise by co-relation multiple scans. Through the co-relations scans, we could determine whether it is disturbed or not. If it is not disturbed, then the result is reliable; if it is disturbed, we could re-scan at a different frequency. In this way we could filter some long-periodic transcient noise such as power source noise and LCD screen noise.

Co-relation multiple scans at the same frequency could filter the noise and obtain highly reliable signal. Because the noise generally exists for a very short time, and usually only one scan will be influenced by the noise. If we scan three times at the same frequency, there might be two results which are very close, and one result which is greatly different from the other two results because it is influenced by the noise. We could determine the one result with greater difference as noise signal and neglect it. For the other two close signals, we could take the average of the two signals as the final reliable signal.

Noise possesses a certain degree of definiteness. Even uncertain noise possesses such character under specific environment. The noise of definiteness usually has a definite spectrum. In some filtering methods such as orthogonal modulation, if the noise is very close to signal, the noise will disturb the signal. One should change the scanning frequency to reduce the influence of the noise. In our co-relation scan method, if the noise appears in multiple scans, we should change a frequency for scan. We should still change again if the changed frequency is also noise influenced. A great deal of touch panel noise exists transciently such as it only exists for one hundredth of time. Thus, if we process multiple fast co-relation scans for the same signal, and we filter the extreme results and take the average of the close results, we could obtain a reliable result free of noise.

Noise is usually of fixed frequency. If the noise frequency is the same as sampling frequency, then the noise can not be filtered. We could change the sampling frequency to generalize the noise. A frequently used method to control the sampling frequency is pseudo random sequence.

The continuous use of normal scans and empty scans could be deemed co-relation scans. Assuming in a system with the following parameters: capacitance variation rate=10%, determinant=40% of capacitance variation rate, scan frequency=200 KHz, cycle=5 uS, and background noise frequency=fn, we use empty scans and normal scans to scan the system. Assuming we scan at t+2.5 uS and t+7.5 uS respectively, and the intensity of the touch is constant, the touch will change the capacitance, however, the touch will not generate signals by itself. At the empty scan, we only scan the background noise without considering the touch signal. Assuming the system is not saturated, the first scan represents the background noise $V_{s1}=V_N \cdot \sin(2\pi f+\phi_1)$, the second scan represents signal and noise $V_{s2}=V_N \cdot \sin(2\pi f+\phi_2)+V_s$, if there is no touch, then Vs=0, the difference between two scans will be $$V_{s2} - V_{s1} = V_N \cdot (\sin(2\pi f + \phi_2) + \sin(2\pi f + \phi_1))$$

$$= 2V_N \cdot \cos[2\pi f + (\phi_1 + \phi_2)/2] \cdot \sin(\phi_2 - \phi_2).$$

Because delta t=5 uS, then $\phi_2-\phi_1=2\pi f\Delta t=10^{-5}\pi f$. When Vs2−$V_{s1}$=0.4*Vs, it represents an error touch, then $$V_N \cdot \cos[2\pi f + (\phi_1 + \phi_2)/2] \cdot \sin(\phi_2 - \phi_1) \le 0.4 V_S$$

$$V_N \le \frac{2V_S}{5 \cdot \cos[2\pi f + (\phi_1 + \phi_2)/2] \cdot \sin(10^{-5}\pi f)},$$

assuming $\phi 1=0$, and $\phi 2=10-5$ $\pi f$, then $$V_N \le \frac{2V_S}{5 \cdot \cos[2\pi f + 5 \times 10^{-5}\pi f] \cdot \sin(10^{-5}\pi f)},$$

in the left formula, the cos function $\le 1$, the envelop of the minimum value of |VN| is $$V_N \le \frac{2V_S}{5\sin(10^{-5}\pi f)}.$$

We could see even a great VN will be attenuated at low frequency.

The invention could eliminate background noise without raising hardware cost. Thus, the invention could operate by a noisier power source or could reduce the mask layers in order to save costs.

A flow chart of the invention is shown in FIG. 1. The invention relates to a method of filtering noise in touch panels. In step 10 and step 20, we start the correlation multiple scan on the same channel for more than one time, such as two times, three times, four times, five times, six times or more. Then we define a difference value, and in step 20, we could perform an empty scan first. The empty scan is the scan when the emitting node does not emit any signal. The value obtained by the empty scan could be deemed as noise signal. Then we could deduct the empty scan value from all values we obtain later before we compare those values.

In step 30, we compare the difference value with the results of multiple scans. If the differences among all the results are greater than the defined difference value, then go to step 40, if the difference between any two results is smaller than the defined difference value, then we take the two results with the smallest difference as true, and go to step 301 to store the average of the two results with the smallest difference. In step 40, if it is the first scan, then go back to step 20. If it is the second scan or the third scan, then go to step 50, change an emitting frequency and restart the scan at a different frequency. In step 60, If it is the first or the second time that we change the emitting frequency, then go back to step 20. If it is the third time that we change the emitting frequency, then go to step 70. In step 70, we take a long scan, that is continuous, multiple scans for the same signal until two results with difference smaller than the defined difference value are found. We store the average of such two results in step 80. The average value we obtained in step 301 or step 80 is the true value with the noise being filtered.

This invention has been described with reference to embodiments. It shall be understood, however, that many alternative modifications and variations will be apparent to those having ordinary skill in the pertinent art in light of the foregoing description. Accordingly, the present invention embraces all such alternative modifications and variations as fall within the spirit and scope of the appended claims.

What is claimed is:

1. A method comprising:
   (a) performing, while a touch panel is being touched, a series of scans of the touch panel at a single frequency, with each scan yielding a scan value;
   (b) comparing the scan values of the series to each other to find a set of scan values that are close to each other in that they differ from each other by less than a threshold;
   (c) if the set of close scan values are found, then setting a final scan value to an average of the close scan values;
   (d) repeating steps (a)-(c) at the same single frequency until
      (i) the set of close scan values are found within a single series, or
      (ii) steps (a)-(c) have been performed a predetermined number of times, whichever occurs first; and
   (e) if steps (a)-(d) have been performed the predetermined number times without the set of close scan values being found within a single series, then repeating steps (a)-(d) with a different frequency.

2. The method of claim 1 wherein the predetermined number of times is two.

3. The method of claim 1 wherein the predetermined number of times is three.

4. The method of claim 1 wherein step (e) includes repeating steps (a)-(d), each time with a different frequency, until
   (i) the set of close scan values are found within a single series, or
   (ii) steps (a)-(d) have been performed at a predetermined number of frequencies, whichever occurs first;
and the method further comprising:
   (f) if steps (d)-(e) have been performed at the predetermined number of frequencies without the set of close scan values being found within a single series, then performing a long scan by
      (i) continuously performing a scan of the panel at a single frequency, with each scan yielding a scan value, until the set of close scan values are found, and
      (ii) setting the final scan value to an average of the set of close scan values.

5. The method of claim 4 wherein the predetermined number of frequencies is two.

6. The method of claim 1 wherein step (a) includes correcting each scan value for noise, by performing an empty scan to obtain a noise value and then subtracting the noise value from each scan value.

7. The method of claim 6 wherein, in the empty scan, no drive signal is emitted to the touch panel.

8. The method of claim 1 wherein the number of scans in the series is two.

9. The method of claim 1 wherein the number of scans in the series is three.

10. The method of claim 1 wherein the number of scans in the series is four.

11. The method of claim 1 wherein the number of scans in the series is five.

12. The method of claim 1 wherein the set of close scan values is a predetermined number of close scan values.

13. The method of claim 12 wherein the set of close scan values is a pair of close scan values.

14. The method of claim 12 wherein, in step (c), if more than one set of close scan values is found, then averaging the scan values of the set that has the smallest difference between its scan values.

15. A touch panel configured to:
   (a) perform, while the touch panel is being touched, a series of scans of the touch panel at a single frequency, with each scan yielding a scan value;
   (b) compare the scan values of the series to each other to find a set of scan values that are close to each other in that they differ from each other by less than a threshold;
   (c) set a final scan value to an average of the close scan values if the set of close scan values are found;
   (d) repeat steps (a)-(c) at the same single frequency until
      (i) the set of close scan values are found within a single series, or
      (ii) steps (a)-(c) have been performed a predetermined number of times, whichever occurs first; and
   (e) if steps (a)-(d) have been performed the predetermined number times without the set of close scan values being found within a single series, then repeat steps (a)-(d) with a different frequency.

* * * * *